(12) United States Patent
Ayuzawa

(10) Patent No.: US 10,322,752 B2
(45) Date of Patent: Jun. 18, 2019

(54) VEHICLE BODY SIDE STRUCTURE

(71) Applicant: HONDA MOTOR CO., LTD., Tokyo (JP)

(72) Inventor: Shotaro Ayuzawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 44 days.

(21) Appl. No.: 15/622,223

(22) Filed: Jun. 14, 2017

(65) Prior Publication Data

US 2017/0361875 A1   Dec. 21, 2017

(30) Foreign Application Priority Data

Jun. 16, 2016   (JP) ................................ 2016-119580

(51) Int. Cl.
| | |
|---|---|
| *B62D 21/15* | (2006.01) |
| *B62D 27/06* | (2006.01) |
| *B62D 27/02* | (2006.01) |
| *B62D 25/20* | (2006.01) |
| *B62D 25/04* | (2006.01) |
| *B62D 29/00* | (2006.01) |
| *B62D 25/02* | (2006.01) |

(52) U.S. Cl.
CPC ........... *B62D 21/15* (2013.01); *B62D 25/025* (2013.01); *B62D 25/04* (2013.01); *B62D 25/2036* (2013.01); *B62D 27/02* (2013.01); *B62D 27/026* (2013.01); *B62D 27/065* (2013.01); *B62D 29/001* (2013.01)

(58) Field of Classification Search
CPC .. B62D 25/2036; B62D 25/04; B62D 25/025; B62D 21/15; B62D 27/065; B62D 27/026; B62D 27/02; B62D 29/001

USPC ..................................................... 296/193.05
See application file for complete search history.

(56) References Cited

U.S. PATENT DOCUMENTS

| | | | |
|---|---|---|---|
| 2013/0049405 A1* | 2/2013 | Kurogi | B62D 25/04 296/203.01 |
| 2015/0008703 A1* | 1/2015 | Furusaki | B62D 21/152 296/187.08 |

FOREIGN PATENT DOCUMENTS

| | | |
|---|---|---|
| JP | 2013-252816 A | 12/2013 |
| JP | 2014-91423 A | 5/2014 |

* cited by examiner

*Primary Examiner* — Joseph D. Pape
*Assistant Examiner* — Dana D Ivey
(74) *Attorney, Agent, or Firm* — Westerman, Hattori, Daniels & Adrian

(57) ABSTRACT

A plurality of metallic bulkheads fixed at predetermined intervals inside a side sill includes a partition wall portion partitioning an inner space of the side sill and a bonding flange portion formed to surround an outer periphery of the partition wall portion and bonded to an inner surface of the side sill and has an I-shaped cross-section. The partition wall portion of one bulkhead fixed to an upper curved portion is disposed to be substantially parallel to a radial direction passing through a curved center of the upper curved portion such that the partition wall portion is propped to prevent the upper curved portion from being crushed when a collision load in a front and rear direction is input to a pillar portion of the side sill to prevent the collapse deformation of the pillar portion.

14 Claims, 6 Drawing Sheets

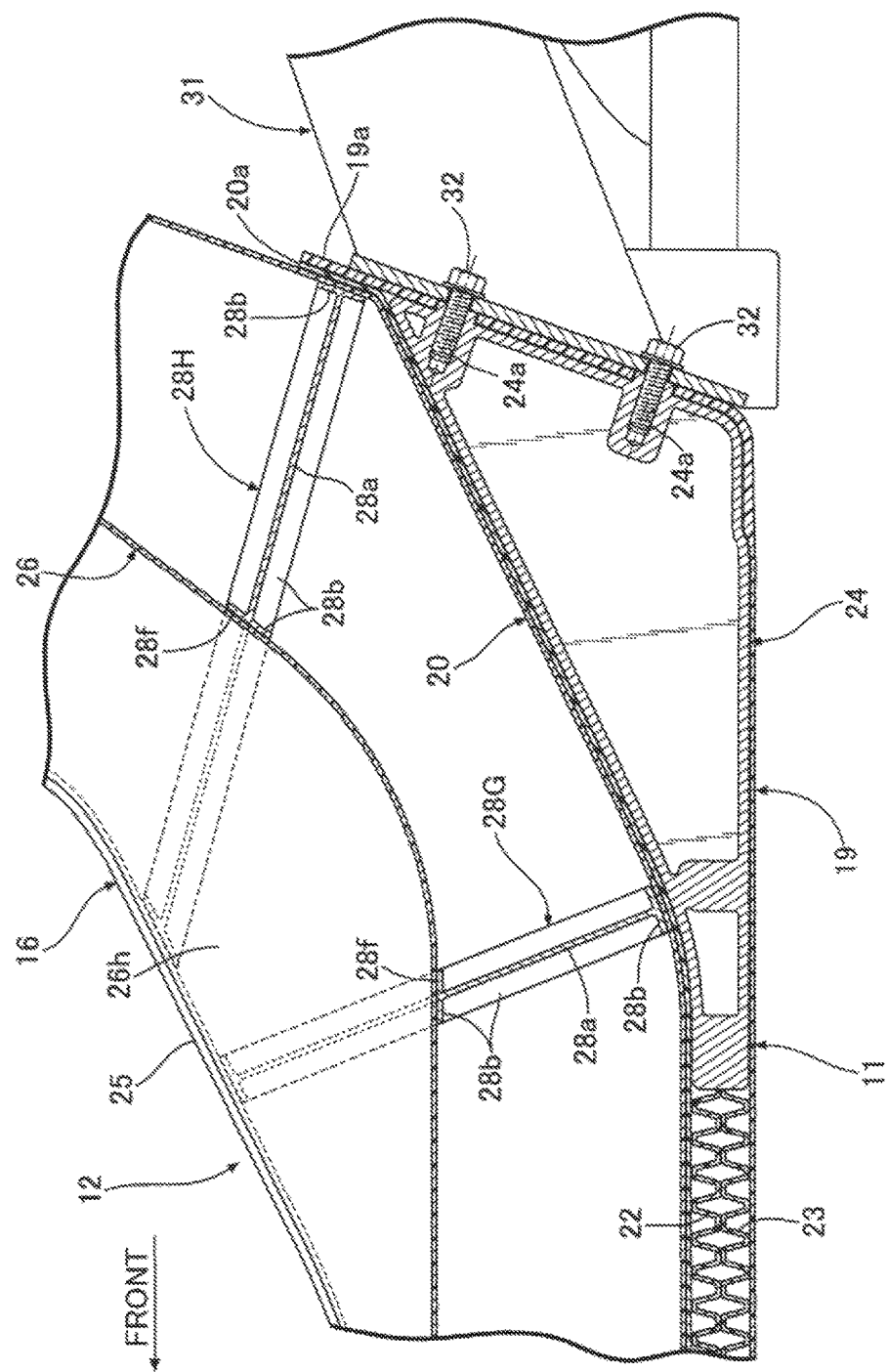

VEHICLE BODY SIDE STRUCTURE

CROSS REFERENCES TO RELATED APPLICATIONS

The present application claims priority under 35 U.S.C. § 119 to Japanese Patent Application No. 2016-119580, filed Jun. 16, 2016, entitled "Vehicle Body Side Structure." The contents of this application are incorporated herein by reference in their entirety.

TECHNICAL FIELD

The present disclosure relates to a vehicle body side structure of an automobile in which a pair of side sills made of FRP includes a side sill body extending in a front and rear direction along each of both side portions of a floor panel in a vehicle width direction, an upper curved portion formed in at least one end of the side sill body in the front and rear direction, and a pillar portion standing upward from an upper end of the upper curved portion and a plurality of metallic bulkheads fixed at predetermined intervals inside the side sill and having an I-shaped cross-section includes a partition wall portion dividing an inner space of the side sill and a bonding flange portion formed to surround the outer periphery of the partition wall portion and bonded to an inner surface of the side sill.

BACKGROUND

In a vehicle body made of CFRP (Carbon Fiber Reinforced Plastic) of an automobile provided with a floor panel formed by integrating an outer skin and an inner skin with a core interposed therebetween, a side sill, and a front pillar lower, a bracing member corresponding to a corrugated core and made of CFRP or a reinforcing member having a flat plate shape, extending in a front and rear direction, and made of CFRP is disposed inside an upper curved portion in which the front pillar lower stands from a front end of the side sill in order to increase a collapse rigidity of the upper curved portion against a collision load of a front collision. This technique is generally known as disclosed in Japanese Laid-Open Patent Publication No. 2013-252816 and Japanese Laid-Open Patent Publication No. 2014-091423 below.

SUMMARY

However, in the above-described related art, since the bracing member or the reinforcing member for reinforcing the upper curved portion at the front end of the side sill is made of CFRP and the bracing member or the reinforcing member is not disposed in a direction in which a bending load acting on the curved portion is efficiently supported, there would be room for improving the collapse rigidity of the upper curved portion when the collision load of the front collision is input.

It is preferable to increase a collapse rigidity of a pillar portion standing upright from a side sill body of a side sill made of FRP through an upper curved portion.

According to first aspect of embodiments, there is suggested a vehicle body side structure of an automobile in which a pair of side sills made of FRP includes a side sill body extending in a front and rear direction along each of both side portions of a floor panel in a vehicle width direction, an upper curved portion formed in at least one end of the side sill body in the front and rear direction, and a pillar portion standing upward from an upper end of the upper curved portion, and a plurality of metallic bulkheads fixed at predetermined intervals inside the side sill and having an I-shaped cross-section includes a partition wall portion dividing an inner space of the side sill and a bonding flange portion formed to surround the outer periphery of the partition wall portion and bonded to an inner surface of the side sill, wherein the partition wall portion of the bulkhead (28C) fixed to the upper curved portion is disposed to be substantially parallel to a radial direction passing through a curved center of the upper curved portion.

According to second aspect, there is suggested the vehicle body side structure of an automobile, wherein the bonding flange portion of at least one bulkhead among the plurality of bulkheads includes a convex portion fitted into a through-hole formed in the side sill.

According to third aspect, there is suggested the vehicle body side structure of an automobile, wherein the at least one bulkhead includes a female screw opened to the convex portion and a metallic abutting member contacting an outer surface of the bulkhead is fastened by a bolt threaded into the female screw while contacting the convex portion.

According to fourth aspect, there is suggested the vehicle body side structure of an automobile, wherein a thick portion is formed at a corner portion of the side sill and a concave portion to which the thick portion is fitted is formed at an outer periphery of the bulkhead.

According to fifth aspect, there is suggested the vehicle body side structure of an automobile, wherein the partition wall portion of the bulkhead disposed in the vicinity of an upper curved portion formed at a rear end of the side sill body includes a concave portion to which a lower edge or a rear edge of a door is fitted.

According to sixth aspect, there is suggested the vehicle body side structure of an automobile, wherein a metallic bulkhead extending in the front and rear direction or an up and down direction is disposed inside the floor panel located below the pillar portion and the upper curved portion formed at the rear end of the side sill body and a female screw for fastening a rear frame is formed at a rear end of the bulkhead.

Further, for example, the front upper curved portion 14 and the rear upper curved portion 16 of the embodiment correspond to the upper curved portion of the invention, and the front pillar portion 15 and the rear pillar portion 17 of the embodiment correspond to the pillar portion of the invention.

According to the first aspect, a pair of side sills made of FRP includes a side sill body extending in a front and rear direction along each of both side portions of a floor panel in a vehicle width direction, an upper curved portion formed in at least one end of the side sill body in the front and rear direction, and a pillar portion standing upward from an upper end of the upper curved portion. Further, a plurality of metallic bulkheads fixed at predetermined intervals inside the side sill and having an I-shaped cross-section includes a partition wall portion dividing an inner space of the side sill and a bonding flange portion formed to surround the outer periphery of the partition wall portion and bonded to an inner surface of the side sill. Furthermore, the partition wall portion of the bulkhead fixed to the upper curved portion is disposed to be substantially parallel to a radial direction passing through a curved center of the upper curved portion. Therefore, when a collision load in the front and rear direction is input to the pillar portion of the side sill, the partition wall portion of the bulkhead is propped to prevent the upper curved portion from being crushed and thus the collapse deformation of the pillar portion can be effectively prevented.

According to the second aspect, since the bonding flange portion of at least one bulkhead among the plurality of bulkheads includes a convex portion fitted into a through-hole formed in the side sill, the positioning accuracy of the bulkhead with respect to the side sill is improved.

According to the third aspect, since at least one bulkhead includes a female screw opened to the convex portion and a metallic abutting member contacting an outer surface of the bulkhead is fastened by a bolt threaded into the female screw while contacting the convex portion, the fastening strength of the abutting member fastened by the bolt is improved due to the contact between the metallic bulkhead and the abutting member and the fastening load does not act on the side sill made of FRP. Therefore, looseness of the bolt due to creep is prevented.

According to the fourth aspect, since a thick portion is formed at a corner portion of the side sill and a concave portion to which the thick portion is fitted is formed at an outer periphery of the bulkhead, the thick portion of the corner portion of the side sill is formed flatly so as not to appear on the surface of the side sill. Therefore, it is possible to improve the appearance of the side sill and easily bond the side sill to the upper surface of the floor panel or the wheel arch portion of the dash panel lower.

According to the fifth aspect, since the partition wall portion of the bulkhead disposed in the vicinity of the upper curved portion formed at a rear end of the side sill body includes a concave portion to which a lower edge or a rear edge of a door is fitted, it is possible to improve the design freedom of the door opening of the rear portion of the vehicle body and improve the strength and rigidity thereof at the same time.

According to the sixth aspect, since a metallic bulkhead extending in the front and rear direction or an up and down direction is disposed inside the floor panel located below the pillar portion and the upper curved portion formed at the rear end of the side sill body and a female screw for fastening a rear frame is formed at a rear end of the bulkhead, it is possible to improve the rigidity of the rear portion of the vehicle body and improve the attachment strength of the rear frame while suppressing an increase in weight to minimum.

BRIEF DESCRIPTION OF THE DRAWINGS

FIG. 6 is a cross-sectional view taken along a line 6-6 of FIG. 5.

DETAILED DESCRIPTION

An embodiment of the present disclosure will be described below with reference to FIGS. 1 to 6. It is noted that the front and rear direction, the left and right direction (the vehicle width direction), and the up and down direction in this specification are defined with reference to the occupant seated in the driver's seat.

Figure 1:
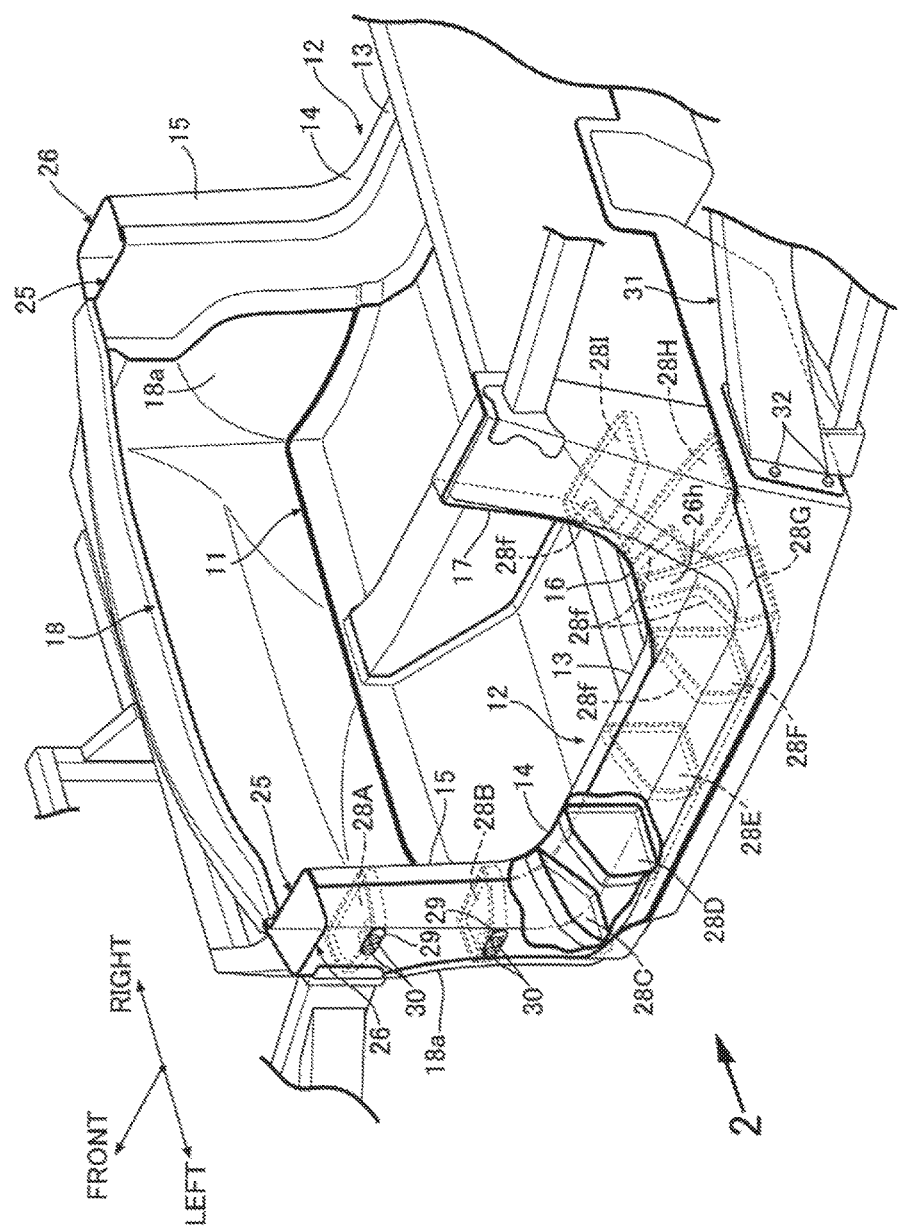
FIG. 1 is a perspective view illustrating a vehicle body of an automobile when viewed from a left rear side.
Figure 2:
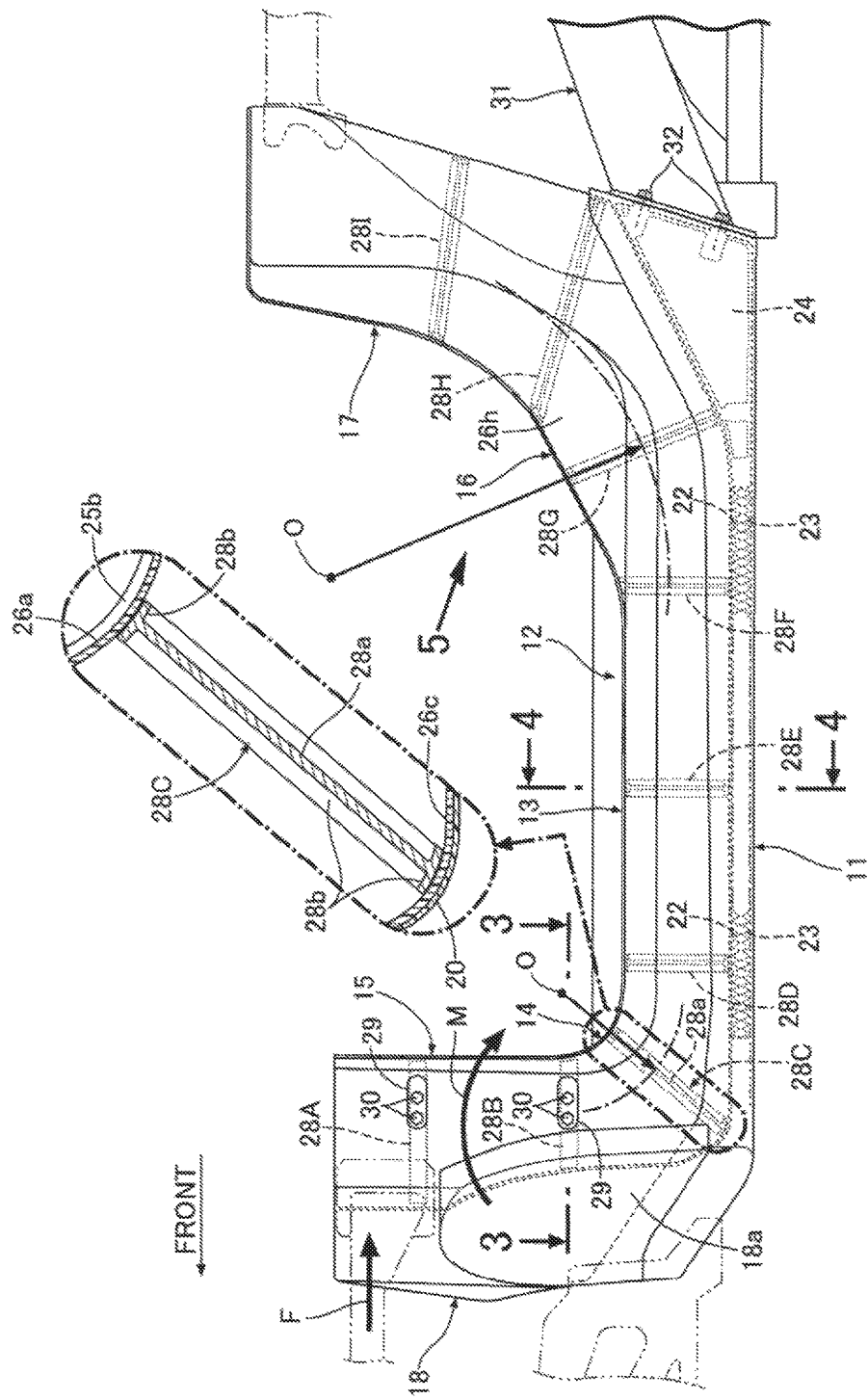
FIG. 2 is a view when viewed from a direction 2 of FIG. 1.

As illustrated in FIGS. 1 and 2, a skeleton of an automobile which is basically made of CFRP (carbon fiber reinforced plastic) includes a floor panel 11 and a pair of left and right side sills 12, 12 extending in the front and rear direction along both side portions of the floor panel 11 in the vehicle width direction. The side sill 12 includes a side sill body 13 which extends in a linear shape in the front and rear direction, a front upper curved portion 14 which is curved upward from a front end of the side sill body 13, a front pillar portion 15 which stands upward from an upper end of the front upper curved portion 14 to form a front pillar lower, a rear upper curved portion 16 which is curved upward from a rear end of the side sill body 13, and a rear pillar portion 17 which stands upward from an upper end of the rear upper curved portion 16 to form a rear pillar lower. Front surfaces of the left and right front pillar portions 15 and 15 and a front end of the floor panel 11 are connected to a dash panel lower 18 having a flat plate shape.

Figure 4:
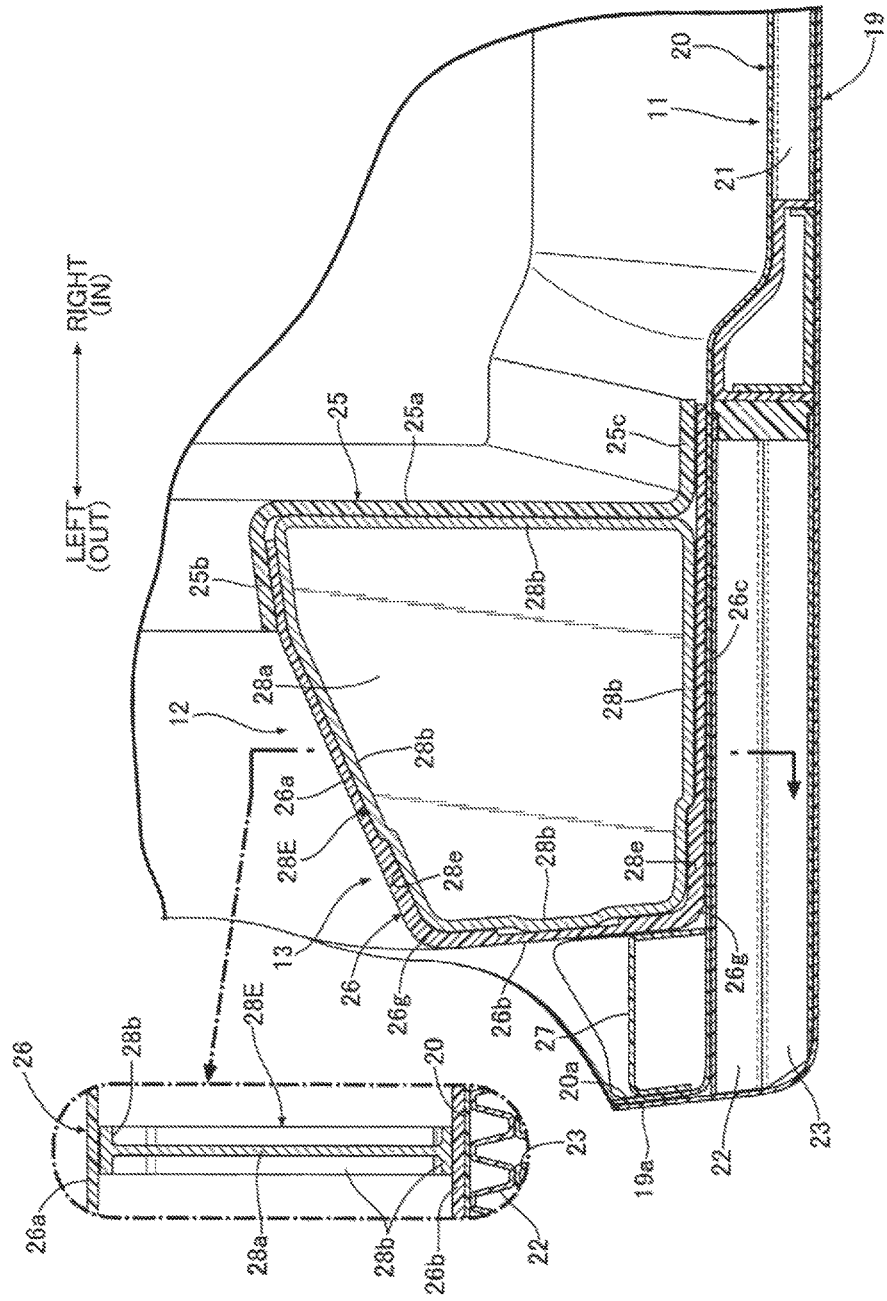
FIG. 4 is a cross-sectional view taken along a line 4-4 of FIG. 2.

As illustrated in FIG. 4, the floor panel 11 has a hollow structure including a lower outer skin 19 and an upper inner skin 20. In a flat portion which is sandwiched between the left and right side sills 12, 12 and an inclined portion which stands obliquely forward from a front end, a single-layer corrugated core 21 is sandwiched between the outer skin 19 and the inner skin 20. Further, the thickness of the floor panel 11 at a position under the side sill 12 is large in the up and down direction and here double-layer corrugated cores 22, 23 are sandwiched between the outer skin 19 and the inner skin 20.

Figure 5:
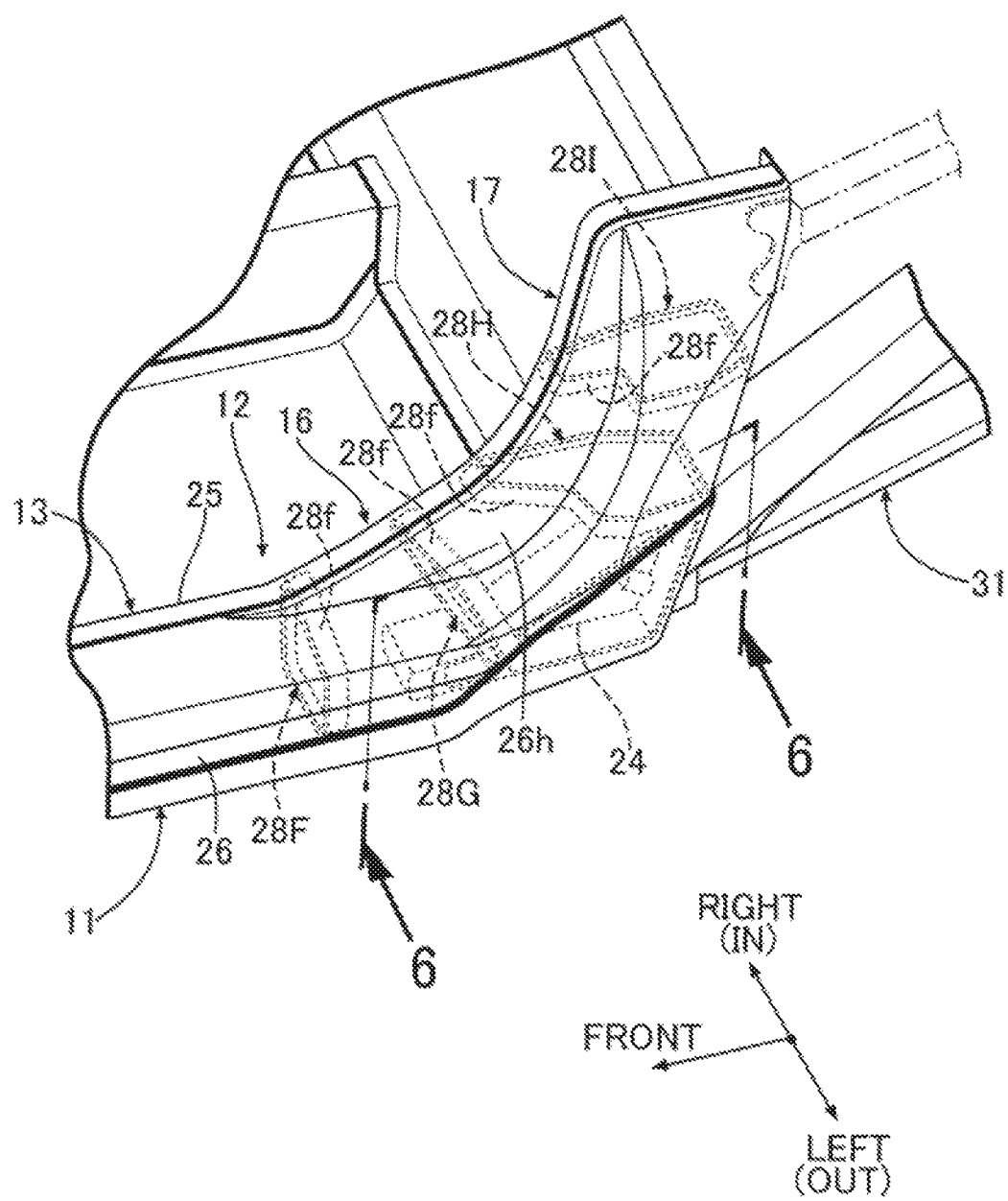
FIG. 5 is a view when viewed from a direction 5 of FIG. 2.

As illustrated in FIGS. 5 and 6, the thickness of the floor panel 11 under the rear upper curved portion 16 and the rear pillar portion 17 in the up and down direction gradually increases backward and a metallic bulkhead 24 having a triangular shape in the side view is disposed therein.

As illustrated in FIG. 4, the side sill 12 has a hollow closed cross-section formed by combining an inner member 25 located at the inside in the vehicle width direction and basically having a flat plate shape and an outer member 26 located at the outside in the vehicle width direction and basically having a U-shaped cross-section. In the side sill body 13, the inner member 25 forms an inner wall 25a in the vehicle width direction, the outer member 26 forms an upper wall 26a and outer wall 26b in the vehicle width direction and lower wall 26c, a bonding flange 25b formed by bending an upper end of the inner wall 25a outward in the vehicle width direction is bonded to an upper surface of the upper wall 26a, and a bonding flange 25c formed by bending a lower end of the inner wall 25a inward in the vehicle width direction is bonded to an upper surface of the lower wall 26c. In the side sill body 13, the lower wall 26c of the outer member 26 is bonded to an upper surface of an outer end of the floor panel 11 in the vehicle width direction. At this time, bonding flanges 19a, 20a of outer ends of the outer skin 19 and the inner skin 20 of the floor panel 11 in the vehicle width direction are bent upward and a lid member 27 extending in the front and rear direction is bonded between upper ends of the bonding flanges 19a, 20a and the outer wall 26b of the outer member 26 of the side sill body 13 in the vehicle width direction.

Figure 3:
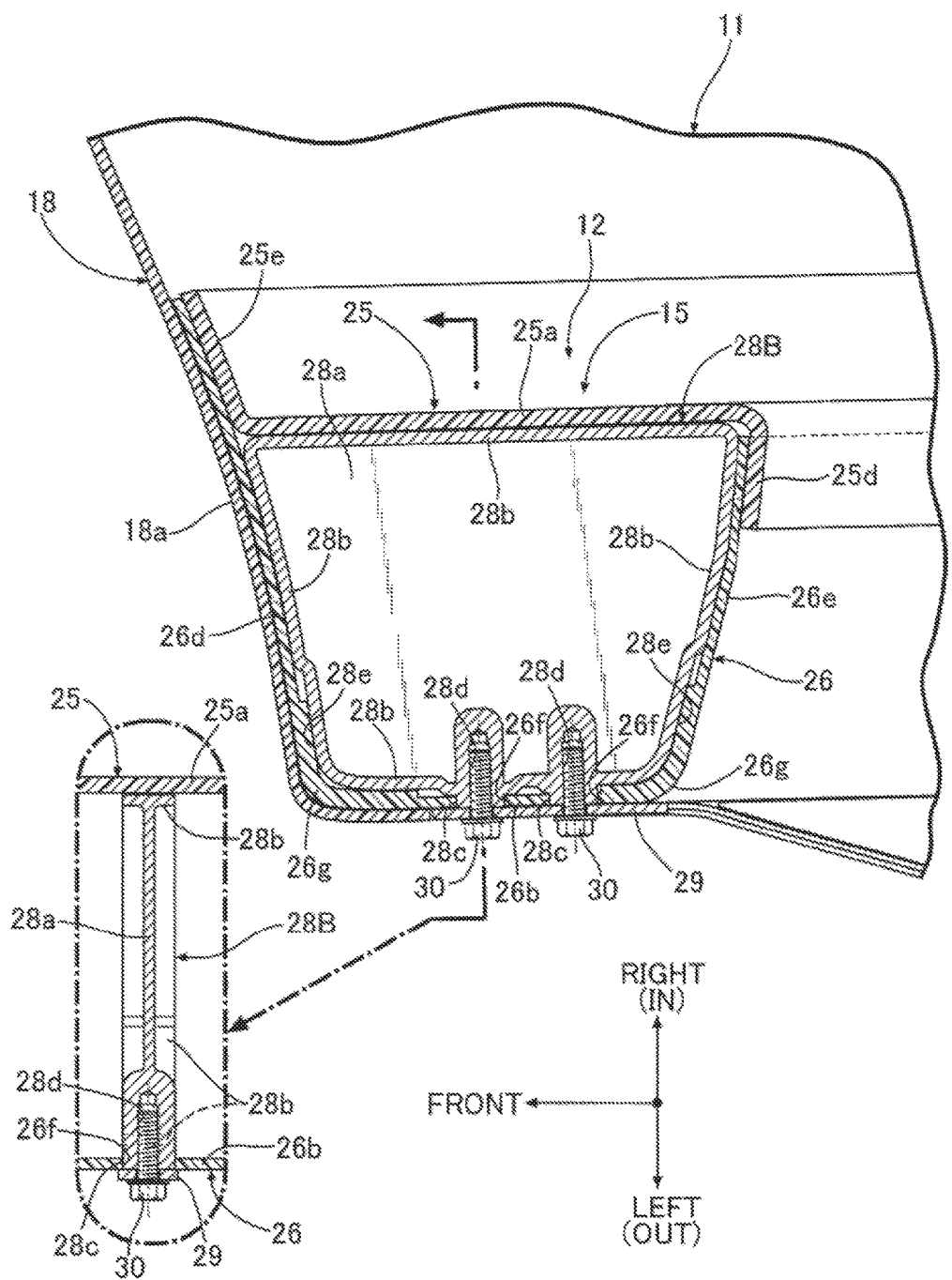
FIG. 3 is a cross-sectional view taken along a line 3-3 of FIG. 2.

As illustrated in FIG. 3, in the front upper curved portion 14 and the front pillar portion 15, the inner member 25 forms the inner wall 25a in the vehicle width direction, the outer member 26 forms a front wall 26d and outer wall 26b in the vehicle width direction and rear wall 26e, a bonding flange 25d formed by bending a rear end of the inner wall 25a outward in the vehicle width direction is bonded to a rear surface of the rear wall 26e, and a bonding flange 25e formed by bending a front end of the inner wall 25a inward in the vehicle width direction is bonded to a rear surface of the front wall 26d. A wheel arch portion 18a of an outer end of the dash panel lower 18 in the vehicle width direction is bonded to a front surface of the front wall 26d of the outer member 26 and an outer surface of a front portion of the outer wall 26b in the vehicle width direction.

As illustrated in FIGS. 1 and 2, nine metallic bulkheads 28A to 28I are disposed at predetermined intervals inside the hollow side sill 12. Each of the bulkheads 28A to 28I includes a partition wall portion 28a which has a flat plate shape and divides the inside of the side sill 12 and a bonding flange portion 28b which is bonded to an inner surface of the side sill 12 while surrounding the periphery of the partition wall portion 28a over 360°.

The partition wall portion 28a of each of the bulkheads 28A to 28I is basically disposed to be orthogonal to the upper wall 26a and the lower wall 26c of the side sill 12, or the front wall 26d and the rear wall 26e of the side sill 12. Particularly, the partition wall portion 28a of the bulkhead 28C disposed at the center portion of the front upper curved portion 14 of the side sill 12 is disposed to be substantially parallel to the radial direction passing through the curved center O of the front upper curved portion 14 (see FIG. 2). Similarly, the partition wall portion 28a of the bulkhead 28G disposed at the center portion of the rear upper curved portion 16 of the side sill 12 is disposed to be substantially parallel to the radial direction passing through the curved center O of the rear upper curved portion 16 (see FIG. 2).

As illustrated in FIG. 3, the bulkhead 28B disposed at the front pillar portion 15 includes two convex portions 28c, 28c which protrude outward in the vehicle width direction from the bonding flange portion 28b and two female screws 28d, 28d which are opened to the outer surfaces of the convex portions 28c, 28c. The convex portions 28c and 28c penetrate two through-holes 26f, 26f formed at the outer wall 26b of the outer member 26 of the front pillar portion 15 in the vehicle width direction and a metallic abutting member 29 covering the outer wall 26b of the outer member 26 in the vehicle width direction is fastened to the bulkhead 28B by two bolts 30, 30 threaded into the female screws 28d, 28d while metal-touching front ends of the convex portions 28c, 28c. Thus, the outer wall 26b of the outer member 26 in the vehicle width direction is fixed while being sandwiched between the abutting member 29 and the bonding flange portion 28b of the bulkhead 28B.

Further, a concave portion 28e in which the bonding flange portion 28b is recessed in a U-shape is formed at a part of an outer surface of the bulkhead 28B in the vehicle width direction and front and rear surfaces continuous thereto, and a thick portion 26g which is formed at the outer member 26 of the front pillar portion 15 is fitted to the concave portion 28e to be bonded thereto.

In addition, the structure of the bulkhead 28A is also the same as that of the bulkhead 28B and the abutting member 29 is fixed at the outside thereof in the vehicle width direction. The abutting member 29 is used as a bracket which fixes a hinge for pivotally supporting, for example, a front edge of a door (not illustrated).

As illustrated in FIGS. 1, 2, and 5, a recess 26h which has an L-shape in the side view and to which a rear portion of a door (not illustrated) is fitted is formed at the outer member 26 of the rear pillar portion 17 and the rear upper curved portion 16 of the rear portion of the side sill 12. For that reason, a concave portion 28f is formed at each of the partition wall portions 28a of four bulkheads 28F to 28I facing the recess 26h.

As illustrated in FIG. 6, female screws 24a, 24a are formed at the bulkhead 24 disposed at the rear end of the floor panel 11 and the front end of the metallic rear frame 31 is fastened to the female screws 24a and 24a by bolts 32, 32.

Next, the operation of the embodiment of the present disclosure having the above-described configuration will be described.

Since the inside of the side sill 12 having a hollow structure and made of CFRP is reinforced by the plurality of bulkheads 28A to 28I dividing the inner space, the collapse rigidity is improved. Particularly, when a backward collision load F (see FIG. 2) is input to the front pillar portion 15 in the event of a front collision of the automobile, a bending moment M acts on the front upper curved portion 14 so that the front wall 26d and the rear wall 26e of the front upper curved portion 14 are crushed and deformed in a direction moving close to each other. However, since the partition wall portion 28a of the bulkhead 28C in which the bonding flange portion 28b is bonded into the front upper curved portion 14 is disposed to be substantially parallel to the radial direction passing through the curved center O of the front upper curved portion 14, the partition wall portion 28a is propped to prevent the front wall 26d and the rear wall 26e from being crushed and thus the backward collapse deformation of the front pillar portion 15 can be effectively prevented.

Similarly, even when a forward collision load is input to the rear pillar portion 17 in the event of a rear collision of the automobile, the forward collapse deformation of the rear pillar portion 17 can be effectively prevented due to the action of the bulkhead 28G disposed at the rear upper curved portion 16.

Further, since the bonding flange portions 28b of the bulkheads 28A, 28B disposed at the front pillar portion 15 include the convex portions 28c, 28c fitted into the through-holes 26f, 26f of the side sill 12, the positioning accuracy of the bulkheads 28A, 28B with respect to the side sill 12 is improved.

Furthermore, since the bulkheads 28A, 28B include the female screws 28d, 28d opened to the convex portions 28c, 28c and the metallic abutting members 29, 29 contacting the outer surfaces of the bulkheads 28A, 28B are fastened by the bolts 30, 30 threaded into the female screws 28d, 28d while contacting the convex portions 28c, 28c, the fastening strength of the abutting members 29, 29 fastened by the bolts 30, 30 is improved due to the contact of the metallic bulkheads 28A, 28B and the metallic abutting members 29, 29 and the fastening load does not act on the side sill 12 made of CFRP. As a result, looseness of the bolts 30, 30 due to creep is prevented.

Moreover, since the thick portion 26g is formed at the corner portion of the side sill 12 facing the bonding flange portions 28b of the bulkheads 28A to 28I and the concave portion 28e to which the thick portion 26g is fitted is formed at the outer peripheries of the bulkheads 28A to 28I, the thick portion 26g of the corner portion of the side sill 12 is formed flatly so as not to appear on the surface of the side sill 12. Therefore, the appearance of the side sill 12 is improved and the side sill 12 is easily bonded to the upper surface of the floor panel 11 or the rear surface of the wheel arch portion 18a of the dash panel lower 18.

Further, since the partition wall portion 28a of each of the bulkheads 28F to 28I disposed in the vicinity of the rear upper curved portion 16 formed at the rear end of the side sill body 13 includes the concave portion 28f fitted to the lower edge or the rear edge of the door, it is possible to improve the design freedom of the door opening of the rear portion of the vehicle body and improve the strength and rigidity thereof at the same time.

Furthermore, since the metallic bulkhead 24 extending in the front and rear direction and the up and down direction is disposed inside the floor panel 11 located below the rear pillar portion 17 and the rear upper curved portion 16 formed at the rear end of the side sill body 13 and the female screws 24a, 24a for fastening the rear frame 31 are formed at the rear end of the bulkhead 24, it is possible to increase the rigidity of the rear portion of the vehicle body and increase the attachment strength of the rear frame 31 while suppressing an increase in weight to minimum.

Although the embodiment of the present invention has been described above, various design changes can be made without departing from the spirit of the present invention. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

For example, the FRP of the present invention is not limited to the CFRP of the embodiment and may be another type of FRP such as GFRP (Glass Fiber Reinforced Plastic).

The invention claimed is:

1. A vehicle body side structure comprising:
a pair of side sills made of Fiber Reinforced Plastic (FRP), each of the side sills including a side sill body extending in a front and rear direction along a corresponding one side portion of a floor panel in a vehicle width direction, an upper curved portion disposed in at least one end of a front end and a rear end of the side sill body, and a pillar portion standing upward from an upper end of the upper curved portion; and
a plurality of metallic bulkheads disposed and fixed inside the respective side sills at predetermined intervals, the respective bulkheads having an I-shaped cross-section, and including a partition wall portion partitioning an inner space of the respective side sills and a bonding flange portion configured to surround an outer periphery of the partition wall portion and bonded to an inner surface of the respective side sills,
wherein the partition wall portion of the bulkhead fixed to the upper curved portion is disposed to be substantially parallel to a radial direction passing through a center of curvature of a curved shape of the upper curved portion,
wherein the bonding flange portion of at least one bulkhead among the plurality of bulkheads includes a convex portion fitted into a through-hole formed in the respective side sills.

2. The vehicle body side structure according to claim 1, wherein the at least one bulkhead includes a female screw opened toward the convex portion, and
a metallic abutting member contacting an outer surface of the at least one bulkhead is fastened by a bolt threaded into the female screw while contacting the convex portion.

3. The vehicle body side structure according to claim 1, wherein the respective side sills includes a thick portion at a corner portion of the respective side sills, and
at least one of bulkheads includes a concave portion at an outer periphery thereof to which the thick portion is fitted.

4. The vehicle body side structure according to claim 3, wherein the thick portion projects toward inside of the respective side sills.

5. The vehicle body side structure according to claim 1, wherein the partition wall portion of at least one of the bulkheads disposed in the vicinity of the upper curved portion disposed at the rear end of the side sill body includes a concave portion to which a lower edge or a rear edge of a door is fitted.

6. The vehicle body side structure according to claim 1, wherein a second metallic bulkhead extending in the front and rear direction and an up and down direction is disposed inside the floor panel located below the pillar portion and the upper curved portion both disposed at the rear end of the side sill body, and
the second metallic bulkhead includes a female screw at a rear end thereof for fastening a rear frame.

7. The vehicle body side structure according to claim 1, wherein the partition wall portion extends in the vehicle width direction.

8. A vehicle body side structure comprising:
a side sill made of Fiber Reinforced Plastic (FRP), the side sill including a side sill body extending in a front and rear direction along a side portion of a floor panel in a vehicle width direction, an upper curved portion disposed in at least one end of a front end and a rear end of the side sill body and curved upward from the at least one end of the front end and the rear end of the side sill body, and a pillar portion standing upward from an upper end of the upper curved portion; and
a plurality of metallic bulkheads disposed and fixed inside the side sill at predetermined intervals, the respective bulkheads having an I-shaped cross-section, and including a partition wall portion partitioning an inner space of the side sill and a bonding flange portion configured to surround an outer periphery of the partition wall portion and bonded to an inner surface of the side sill,
wherein the plurality of metallic bulkheads comprises a first bulkhead and a second bulkhead disposed in the upper curved portion,
wherein the partition wall portion of the first bulkhead fixed to the upper curved portion is disposed to be substantially parallel to a first radial direction passing through a center of curvature of a curved shape of the upper curved portion, the partition wall portion of the second bulkhead fixed to the upper curved portion is disposed to be substantially parallel to a second radial direction passing through the center of curvature of the curved shape of the upper curved portion, and the first radial direction and the second radial direction are not parallel to each other.

9. A vehicle body side structure comprising:
a pair of side sills made of Fiber Reinforced Plastic (FRP), each of the side sills including a side sill body extending in a front and rear direction along a corresponding one side portion of a floor panel in a vehicle width direction, an upper curved portion disposed in at least one end of a front end and a rear end of the side sill body, and a pillar portion standing upward from an upper end of the upper curved portion; and a plurality of metallic bulkheads disposed and fixed inside the respective side sills at predetermined intervals, the respective bulkheads having an I-shaped cross-section, and including a partition wall portion partitioning an inner space of the respective side sills and a bonding flange portion configured to surround an outer periphery of the partition wall portion and bonded to an inner surface of the respective side sills, wherein the partition wall portion of the bulkhead fixed to the upper curved portion is disposed to be substantially parallel to a radial direction passing through a center of curvature of a curved shape of the upper curved portion, wherein a second metallic bulkhead extending in the front and rear direction and an up and down direction is disposed inside the floor panel located below the pillar portion and the upper curved portion both disposed at the rear end of the side sill body, and the second metallic bulkhead includes a female screw at a rear end thereof for fastening a rear frame.

10. The vehicle body side structure according to claim 9, wherein the bonding flange portion of at least one bulkhead among the plurality of bulkheads includes a convex portion fitted into a through-hole formed in the respective side sills, wherein the at least one bulkhead includes a female screw opened toward the convex portion, and a metallic abutting member contacting an outer surface of the at least one bulkhead is fastened by a bolt threaded into the female screw while contacting the convex portion.

11. The vehicle body side structure according to claim 9, wherein the respective side sills includes a thick portion at a corner portion of the respective side sills, and at least one of bulkheads includes a concave portion at an outer periphery thereof to which the thick portion is fitted.

12. The vehicle body side structure according to claim 11, wherein the thick portion projects toward inside of the respective side sills.

13. The vehicle body side structure according to claim 9, wherein the partition wall portion of at least one of the bulkheads disposed in the vicinity of the upper curved portion disposed at the rear end of the side sill body includes a concave portion to which a lower edge or a rear edge of a door is fitted.

14. The vehicle body side structure according to claim 9, wherein the partition wall portion extends in the vehicle width direction.

* * * * *